US008812185B2

United States Patent
Amano et al.

(10) Patent No.: US 8,812,185 B2
(45) Date of Patent: Aug. 19, 2014

(54) DIAGNOSTIC APPARATUS AND DIAGNOSTIC METHOD OF HYBRID VEHICLE

(71) Applicant: Honda Motor Co., Ltd., Tokyo (JP)

(72) Inventors: Masato Amano, Utsunomiya (JP); Yuki Oshitani, Utsunomiya (JP); Yutaka Tsuji, Utsunomiya (JP); Akihiro Shinjo, Haga-gun (JP); Atsushi Izumiura, Utsunomiya (JP); Keisuke Minatoya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/978,857

(22) PCT Filed: Nov. 19, 2012

(86) PCT No.: PCT/JP2012/079945
§ 371 (c)(1),
(2), (4) Date: Jul. 9, 2013

(87) PCT Pub. No.: WO2013/084705
PCT Pub. Date: Jun. 13, 2013

(65) Prior Publication Data
US 2014/0067179 A1  Mar. 6, 2014

(30) Foreign Application Priority Data

Dec. 5, 2011 (JP) .................................. 2011-265976

(51) Int. Cl.
*G06F 11/00* (2006.01)
*B60W 20/00* (2006.01)

(52) U.S. Cl.
USPC .......................................... 701/22; 701/29.2

(58) Field of Classification Search
None
See application file for complete search history.

(56) References Cited

U.S. PATENT DOCUMENTS 5,485,374 A * 1/1996 Takaku et al. ................. 701/31.6
6,276,472 B1 * 8/2001 Takashima et al. ........ 180/65.21

(Continued)

FOREIGN PATENT DOCUMENTS

| JP | 2008-279823 A | 11/2008 |
|---|---|---|
| JP | 4379407 B2 | 12/2009 |
| JP | 2010-012897 | 1/2010 |

(Continued)

OTHER PUBLICATIONS

Japanese Notice of Allowance, Application No. 2013-513434 mailing date Oct. 8, 2013, along with English translation.

(Continued)

*Primary Examiner* — John R Olszewski
*Assistant Examiner* — Navid Ziaeian Mehdizadeh
(74) *Attorney, Agent, or Firm* — Arent Fox LLP

(57) ABSTRACT

A diagnostic apparatus of a hybrid vehicle having an internal combustion engine, a motor, and a diagnostic unit that diagnoses a vehicle state by motoring the internal combustion engine using the motor in a zero output state. A detection unit detects a required driving force of a driver. A determination unit determines whether or not a remaining time required until a diagnostic completion is a predetermined time or less, in a case where the required driving force with a predetermined lower limit value or more is detected by the required driving force detection unit when the vehicle state is diagnosed by the diagnostic unit. A control device causes the motor to output the driving force, when the remaining time is the predetermined time or less, and continues the vehicle state diagnosis using the diagnostic unit by motoring the engine when the output of the internal combustion engine is zero.

8 Claims, 3 Drawing Sheets

(56) References Cited

U.S. PATENT DOCUMENTS

| | | | |
|---|---|---|---|
| 6,382,335 B2 * | 5/2002 | Takashima et al. | 180/65.235 |
| 2001/0009147 A1 * | 7/2001 | Takashima et al. | 123/406.14 |
| 2003/0106728 A1 * | 6/2003 | Kitajima et al. | 180/65.2 |
| 2004/0055304 A1 * | 3/2004 | Shimizu et al. | 60/698 |
| 2004/0261755 A1 * | 12/2004 | Segawa et al. | 123/198 F |
| 2009/0299561 A1 * | 12/2009 | Matsumoto | 701/22 |
| 2010/0076635 A1 * | 3/2010 | Sugimoto | 701/22 |

FOREIGN PATENT DOCUMENTS

| | | |
|---|---|---|
| JP | 2010-167899 A | 8/2010 |
| JP | 2010-179712 A | 8/2010 |
| WO | WO 2013/084705 A1 | 6/2013 |

OTHER PUBLICATIONS

International Search Report, International Application No. PCT/JP2012/079945, mailing date Jan. 22, 2013.

* cited by examiner

DIAGNOSTIC APPARATUS AND DIAGNOSTIC METHOD OF HYBRID VEHICLE

CROSS REFERENCE TO RELATED APPLICATIONS

This application is a National Stage entry of International Application PCT/JP2012/079945 filed Nov. 19, 2012, which claims priority of Japanese Patent Application No. 2011-265976 filed Dec. 5, 2011, the disclosure of these prior applications are hereby incorporated in their entirety by reference

TECHNICAL FIELD

The present invention relates to a diagnostic apparatus and a diagnostic method of a hybrid vehicle.

BACKGROUND ART

In the related art, for example, when an internal combustion engine is stopped during a vehicle stop or the like, a diagnostic apparatus is known in which the internal combustion engine is operated by driving a motor generator and thus a diagnosis is performed with respect to an opening degree of an EGR valve included in an exhaust gas recirculation apparatus (for example, refer to PTL 1).

CITATION LIST

Patent Literature

[PTL 1] Japanese Patent No. 4379407

SUMMARY OF INVENTION

Technical Problem

Incidentally, in the above-described diagnostic apparatus according to the related art, if a driver's accelerator operation is performed during a diagnostic performance, there is a case where the diagnosis is stopped, a power output from an internal combustion engine is started, and thus a diagnostic result obtained during the diagnosis is discarded.

In this case, when a next diagnosis is performed, the diagnosis is performed from the beginning, whereby energy required to drive the internal combustion engine using a motor generator during the diagnosis is uselessly wasted, and there is a possibility that the total time required for the diagnosis is increased, and thus distraction to the driver is increased.

An aspect according to the present invention is conceived in view of the above circumstances and is intended to provide a diagnostic apparatus and a diagnostic method of a hybrid vehicle which can prevent energy consumption required for a vehicle diagnosis from increasing and prevent distraction to an occupant due to the diagnostic performance increasing.

Solution to Problem

The present invention adopts the following aspects in order to achieve the object by solving the above problems.

An aspect according to the present invention, in a diagnostic apparatus of a hybrid vehicle which includes an internal combustion engine, a motor that generates a driving force for vehicle travel, and a diagnostic unit that diagnoses a vehicle state by motoring the internal combustion engine using the motor in a state where an output of the internal combustion engine is zero, the apparatus includes a required driving force detection unit that detects a required driving force of a driver; a determination unit that determines whether or not a remaining time required until a diagnostic completion is a predetermined time or less, in a case where the required driving force with a predetermined lower limit value or more is detected by the required driving force detection unit when the vehicle state is diagnosed by the diagnostic unit; and a control device that causes the motor to output the driving force for the vehicle travel, in a case where the remaining time is the predetermined time or less in the determination result of the determination unit, and continues the vehicle state diagnosis using the diagnostic unit by motoring the internal combustion engine using the motor in a state where the output of the internal combustion engine is zero.

An aspect according to the present invention, in a diagnostic method of a hybrid vehicle which includes an internal combustion engine, a motor that generates a driving force for vehicle travel, a diagnostic unit that diagnoses a vehicle state by motoring the internal combustion engine using the motor in a state where an output of the internal combustion engine is zero, and a required driving force detection unit that detects a required driving force of a driver, the method includes a step of determining whether or not a remaining time required until a diagnostic completion is a predetermined time or less, in a case where the required driving force with a predetermined lower limit value or more is detected by the required driving force detection unit when the vehicle state is diagnosed by the diagnostic unit; and a step of causing the motor to output the driving force for the vehicle travel, in a case where the remaining time is the predetermined time or less in the determination result, and continuing the vehicle state diagnosis using the diagnostic unit by motoring the internal combustion engine using the motor in a state where the output of the internal combustion engine is zero.

Advantageous Effects of Invention

When a vehicle state is diagnosed by a diagnostic unit by motoring an internal combustion engine using a motor in a state where an output of the internal combustion engine is zero, a required driving force with a predetermined lower limit value or more is detected by a required driving force detection unit, and thus in a case where a hybrid vehicle travels by transmitting a driving force of the motor to driving wheels, if a remaining time required until diagnostic completion is a predetermined time or less, the diagnosis is continued without being stopped.

Therefore, for example, compared with a case where the diagnosis is always stopped when the required driving force with the predetermined lower limit value or more is detected during the diagnosis, necessity for the re-diagnosis is prevented from occurring at the time of next diagnosis, and energy consumption required for the diagnosis can be prevented from increasing.

Furthermore, when the diagnosis is performed, the internal combustion engine is automatically operated without requiring a driving operation of a driver, and thus the total time for performing the diagnosis is prevented from being prolonged due to the re-diagnosis, whereby it is possible to prevent distraction to an occupant due to a diagnostic performance increasing, and to enhance merchantability.

When the vehicle state is diagnosed by the diagnostic unit by motoring the internal combustion engine using the motor in a state where the output of the internal combustion engine is zero, the required driving force with the predetermined lower limit value or more is detected by the required driving force detection unit, and thus in a case where the hybrid vehicle travels by transmitting the driving force of the motor to the driving wheels, if the remaining time required until the diagnostic completion is the predetermined time or less, the diagnosis is continued without being stopped.

Therefore, for example, compared with a case where the diagnosis is always stopped when the required driving force with the predetermined lower limit value or more is detected during the diagnosis, the necessity for the re-diagnosis is prevented from occurring at the time of the next diagnosis, and the energy consumption required for the diagnosis can be prevented from increasing.

Furthermore, when the diagnosis is performed, the internal combustion engine is automatically operated without requiring the driving operation of the driver, and thus the total time for performing the diagnosis is prevented from being prolonged due to the re-diagnosis, whereby it is possible to prevent distraction to the occupant due to the diagnostic performance increasing, and to enhance the merchantability.

DESCRIPTION OF EMBODIMENTS

Hereinafter, a diagnostic apparatus of a hybrid vehicle according to an embodiment of the present invention will be described referring to the accompanying drawings.

Figure 1:
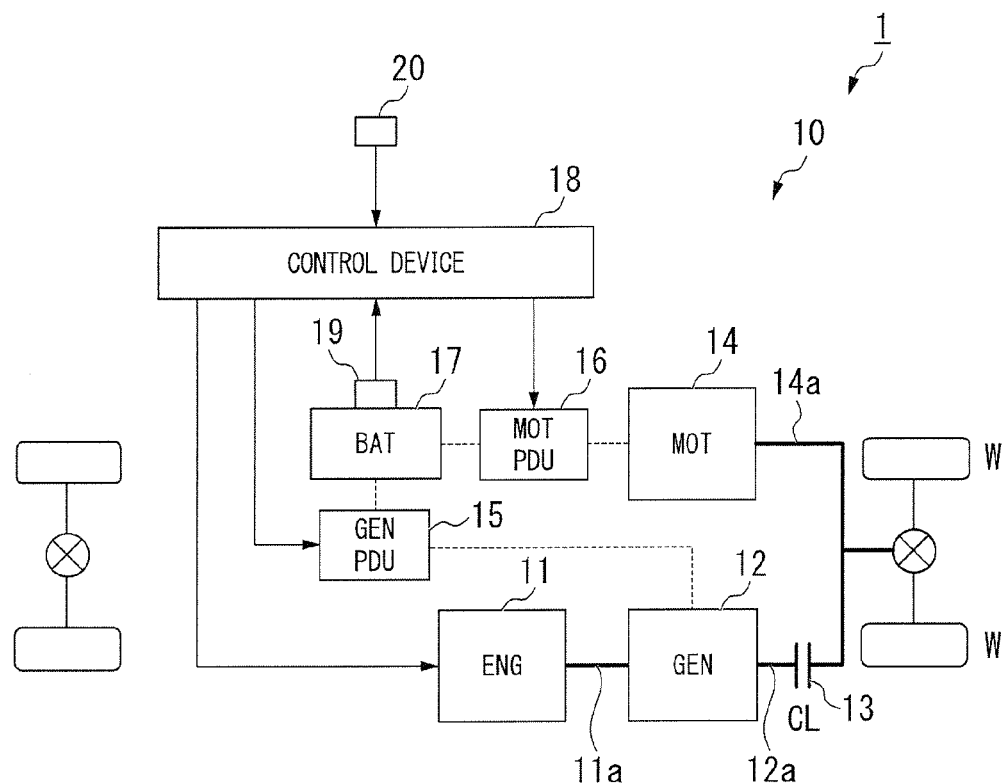
FIG. 1 is a configuration diagram of a diagnostic apparatus of a hybrid vehicle according to an embodiment of the present invention.

For example, the diagnostic apparatus 10 of the hybrid vehicle according to the present embodiment is mounted on the hybrid vehicle 1 illustrated in FIG. 1. For example, the hybrid vehicle 1 is a hybrid vehicle in which a rotation shaft 12a of a motor for power generation (GEN) 12 is connected to a crank shaft 11a of an internal combustion engine (ENG) 11, the rotation shaft 12a of the motor for power generation (GEN) 12 is connected to driving wheels W through a clutch (CL) 13, and a rotation shaft 14a of a motor for travel (MOT) 14 is connected to the driving wheels W.

Each motor 12 or 14 is a DC brushless motor or the like having a U phase, a V phase, and a W phase, and can perform a power running and a power generation driving.

For example, the motor for power generation 12 performs the power running by conducting each phase current of an alternate current to a coil of each phase, and in addition to performing either the driving of the internal combustion engine 11 or the driving wheels W, performs the power generation driving by receiving the driving force from the internal combustion engine 11, and outputs the generated power.

In addition, for example, the motor for travel (motor) 14 performs the power running by conducting each phase current of the alternate current to the coil of each phase, and in addition to performing the driving of the driving wheels W, performs the power generation driving (regeneration driving) by receiving the driving force from the driving wheels W side at the time of deceleration or the like of the hybrid vehicle 1, and outputs the generated power (regeneration power).

For example, the diagnostic apparatus 10 of the hybrid vehicle includes a power drive unit for power generation (GENPDU) 15 which controls a conduction of the motor for power generation 12, a power drive unit for travel (MOTPDU) 16 which controls a conduction of the motor for travel 14, a battery (BAT) 17, and a control device 18 (a diagnostic unit, a required driving force detection unit, a determination unit, and a controller) as an electronic control unit (ECU) configured to have an electronic circuit such as a central processing unit (CPU).

For example, each PDU 15 or 16 is configured to include an inverter (not illustrated) which uses a pulse width modulation (PWM) and includes a bridge circuit formed by a bridge connection using multiple switching elements such as transistors.

The inverter includes the bridge circuit formed by the bridge connection using multiple switching elements (for example, IGBT: insulated gate bipolar mode transistor), and a smoothing capacitor which connects a positive terminal of the bridge circuit to a negative terminal of the bridge circuit. The bridge circuit is driven by a signal which is modulated by using the pulse width modulation and output from the control device 18.

For example, each PDU 15 or 16 converts a direct current power supplied from the battery 1.7 into a three phase alternate current power, based on a gate signal (that is, a PWM signal) which is a switching command output from the control device 18, when the motor for power generation 12 or the motor for travel 14 performs the power running, and conducts each phase current of the alternate current by sequentially conducting the current to each phase coil of the motor for power generation 12 or each phase coil of the motor for travel 14.

On the other hand, for example, when the motor for power generation 12 or the motor for travel 14 performs the power generation driving, each PDU 15 or 16 converts the generated power of the alternate current output from the motor for power generation 12 or the motor for travel 14 into the direct current power, according to the synchronized gate signal based on a rotation angle of the motor for power generation 12 or the motor for travel 14 which is output from the control device 18.

Each PDU 15 or 16 enables a mutual power transmission and reception between the motor for power generation 12 and the motor for travel 14, in addition to the power transmission and reception between each motor 12 or 14 and the battery 17, and for example, enables a supply of the generated power output from the motor for power generation 12 to the motor for travel 14 that performs the power running, using the driving force of the internal combustion engine 11.

The control device 18 controls driving states of the internal combustion engine 11 and each motor 12 or 14, and a state of the hybrid vehicle 1.

For example, the control device 18 controls the driving (electrical conduction) of the motor for power generation 12 through the GENPDU 15, and controls the driving (electrical conduction) of the motor for travel 14 through the MOTPDU 16. In addition, for example, a fuel supply to the internal combustion engine 11 or ignition timing or the like is controlled.

Furthermore, the control device 18 performs a control of surveillance, protection and the like of the battery 17, and calculates a remaining capacity of the battery 17, based on each detection signal of, for example, a voltage, a current, a temperature of the battery 17, and used time and the like of the battery 17.

In addition, for example, the remaining capacity of the battery 17 is calculated by adding and subtracting an accumulated charge amount and an accumulated discharge amount to and from the remaining capacity in an unloaded state of the battery 17 without degradation, such as its initial state, or otherwise for example, is obtained by performing a map search using an estimated open-circuit voltage of the current battery 17 which is estimated based on the voltage, the current, and the temperature, with respect to a map indicating a predetermined correlation between the voltage (the open-circuit voltage) and the remaining capacity in the unloaded state of the battery 17 without the degradation, such as its initial state.

Therefore, detection signals output from various sensors which detect a state amount related to states of the internal combustion engine 11, each motor 12 or 14, each PDU 15 or 16, and the battery 17, detection signals output from various sensors which detect a state amount related to a travel state of the hybrid vehicle 1, and signals and the like which are output from various switches are input to the control device 18.

For example, detection signals output from a rotation sensor which detects a rotation angle of each motor 12 or 14, a sensor 19 which detects the state amount (for example, the voltage, the current, the temperature, the used time or the like) related to the state of the battery 17, an accelerator open-degree sensor 20 (a required driving force detection unit) which detects a stroke amount (accelerator open-degree) of an accelerator pedal, which is caused by accelerator pedal stepping according to the required driving force of a driver, a vehicle speed sensor which detects a speed of the hybrid vehicle 1, and the like are input to the control device 18.

In addition, for example, during the vehicle stop, the EV travel or the vehicle deceleration, the control device 18 allows the motoring of the internal combustion engine 11 in a predetermined rotation number, using the motor for power generation 12 or the motor for travel 14, in a state where the output of the internal combustion engine 11 is zero, and performs the diagnosis of a vehicle state, for example, an exhaust gas control situation of the internal combustion engine 11 or the like.

For example, the control device 18 diagnoses the vehicle state in a state where the output of the internal combustion engine 11 is zero in such a manner that the internal combustion engine 11 is driven, by the driving force output from the motor for power generation 12 during the vehicle stop, or by the driving force output from the motor for power generation 12 or the motor for travel 14 during the EV travel, or otherwise by the driving force transmitted from the driving wheels W during the vehicle deceleration.

Then, when the vehicle state is diagnosed, in a case where the required driving force with a predetermined lower limit value (that is, a lower limit value of the required driving force required for starting the travel of the stopped hybrid vehicle 1) or more is detected (when switched from a vehicle stop state to a vehicle start state, when switched from a vehicle deceleration regeneration state to a power running state, when the required driving force is increased during the EV travel, or the like), based on the detection signal or the like output from the accelerator open-degree sensor 20, the control device 18 determines whether or not the remaining time required until the diagnostic completion is a predetermined time or less.

Then, in a case where the remaining time is the predetermined time or less (for example, several seconds or the like) in the determination result, the driving force is output according to the required driving force from the motor for travel 14 driven only by a storage power of the battery 17, and the diagnosis of the vehicle state is continued.

On the other hand, in a case where the remaining time is longer than the predetermined time in the determination result, the diagnosis of the vehicle state is stopped.

In addition, when the vehicle state is diagnosed, in a case where the required driving force greater than a predetermined determination threshold value which is greater than the predetermined lower limit value is detected, based on the detection signal or the like output from the accelerator open-degree sensor 20, the control device 18 stops the diagnosis of the vehicle state.

In addition, the control device 18 outputs the driving force according to the required driving force from the motor for travel 14 driven only by the storage power of the battery 17, since the remaining time is the predetermined time or less, and stops the diagnosis of the vehicle state which has been continued, in a state where the diagnosis of the vehicle state is continued, based on the detection signal or the like output from the accelerator open-degree sensor 20, in a case where the required driving force greater than the predetermined determination threshold value which is greater than the predetermined lower limit value is detected.

The control device 18, as illustrated in Table 1 below, includes an operation mode of the diagnosis during the vehicle stop, an operation mode of the diagnosis during the EV travel, and an operation mode of the diagnosis stop during the (EV) travel, as an operation mode related to the operation which diagnoses the vehicle state of the hybrid vehicle 1.

TABLE 1

|  |  | CL |
|---|---|---|
| Diagnosis during vehicle stop | Motoring ENG using GEN | OFF |
| Diagnosis during EV travel | EV travel using MOT and motoring ENG using GEN | OFF |
| Diagnosis stop during (EV) travel | EV travel using MOT (and power generation of GEN: series) | OFF |
|  | Start ENG using MOT or driving wheels W (parallel or ENG driving) | ON |

For example, the operation mode of the diagnosis during the vehicle stop is a mode in which the vehicle state is diagnosed in a state where the output of the internal combustion engine 11 is zero, in the stop state of the hybrid vehicle 1.

In the operation mode, the motor for travel 14 is in the stop state, the clutch 13 is in a separation state where a power transmission between the rotation shaft 12a of the motor for power generation 12 and the driving wheels W is in a cutoff state, the internal combustion engine 11 is driven (motoring) by the driving force output from the motor for power generation 12 which performs the power running. Thus the fuel supply and the ignition are not performed.

In addition, for example, the operation mode of the diagnosis during the EV travel is a mode in which during the EV travel of the hybrid vehicle 1, that is, the motor for travel 14 is driven only by the storage power of the battery 17, and during the travel where the driving force output from the motor for travel 14 is transmitted to the driving wheels W, the vehicle state is diagnosed in the state where the output of the internal combustion engine 11 is zero.

In the operation mode, the motor for travel 14 performs the power running, the driving force output from the motor for travel 14 is transmitted to the driving wheels W, the clutch 13 is in the separation state where the power transmission between the rotation shaft 12a of the motor for power generation 12 and the driving wheels W is in the cutoff state, the internal combustion engine 11 is driven (motoring) by the driving force output from the motor for power generation 12 which performs the power running, and thereby the fuel supply and the ignition are not performed.

In addition, for example, the operation mode of the diagnosis stop during the (EV) travel is a mode in which the diagnosis of the vehicle state is stopped, during the EV travel of the hybrid vehicle 1 or during the travel of the ENG driving which transmits the driving force output from the internal combustion engine 11 to the driving wheels W.

In the operation mode, the EV travel, or otherwise a series travel or otherwise a parallel travel, or otherwise a state of the ENG driving is selected.

In the EV travel or the series travel, the motor for travel 14 performs the power running, the driving force output from the motor for travel 14 is transmitted to the driving wheels W, the clutch 13 is in the separation state where the power transmission between the rotation shaft 12a of the motor for power generation 12 and the driving wheels W is in the cutoff state, the internal combustion engine 11 performs the power output in the series travel, and the motor for power generation 12 is in a state where the power generation driving is performed by the driving force output from the internal combustion engine 11.

In the parallel travel, the motor for travel 14 performs the power running, the driving force output from the motor for travel 14 is transmitted to the driving wheels W, the clutch 13 is in the connection state which enables the power transmission between the rotation shaft 12a of the motor for power generation 12 and the driving wheels W.

Then, the internal combustion engine 11 is started by the driving force output from the motor for travel 14 or the driving force transmitted from the driving wheels W side, performs the power output while rotating the motor for power generation 12 and is in a state where the driving force output from the started internal combustion engine 11 is transmitted to the driving wheels W.

In the ENG driving, the motor for travel 14 is in the stop state after at least the internal combustion engine 11 is started, the clutch 13 is in the connection state which enables the power transmission between the rotation shaft 12a of the motor for power generation 12 and the driving wheels W and is in the state where the driving force output from the started internal combustion engine 11 is transmitted to the driving wheels W.

The diagnostic apparatus 10 of the hybrid vehicle according to the present embodiment includes the above-described configuration, and next, the operation of the diagnostic apparatus 10 of the hybrid vehicle will be described.

Figure 2:
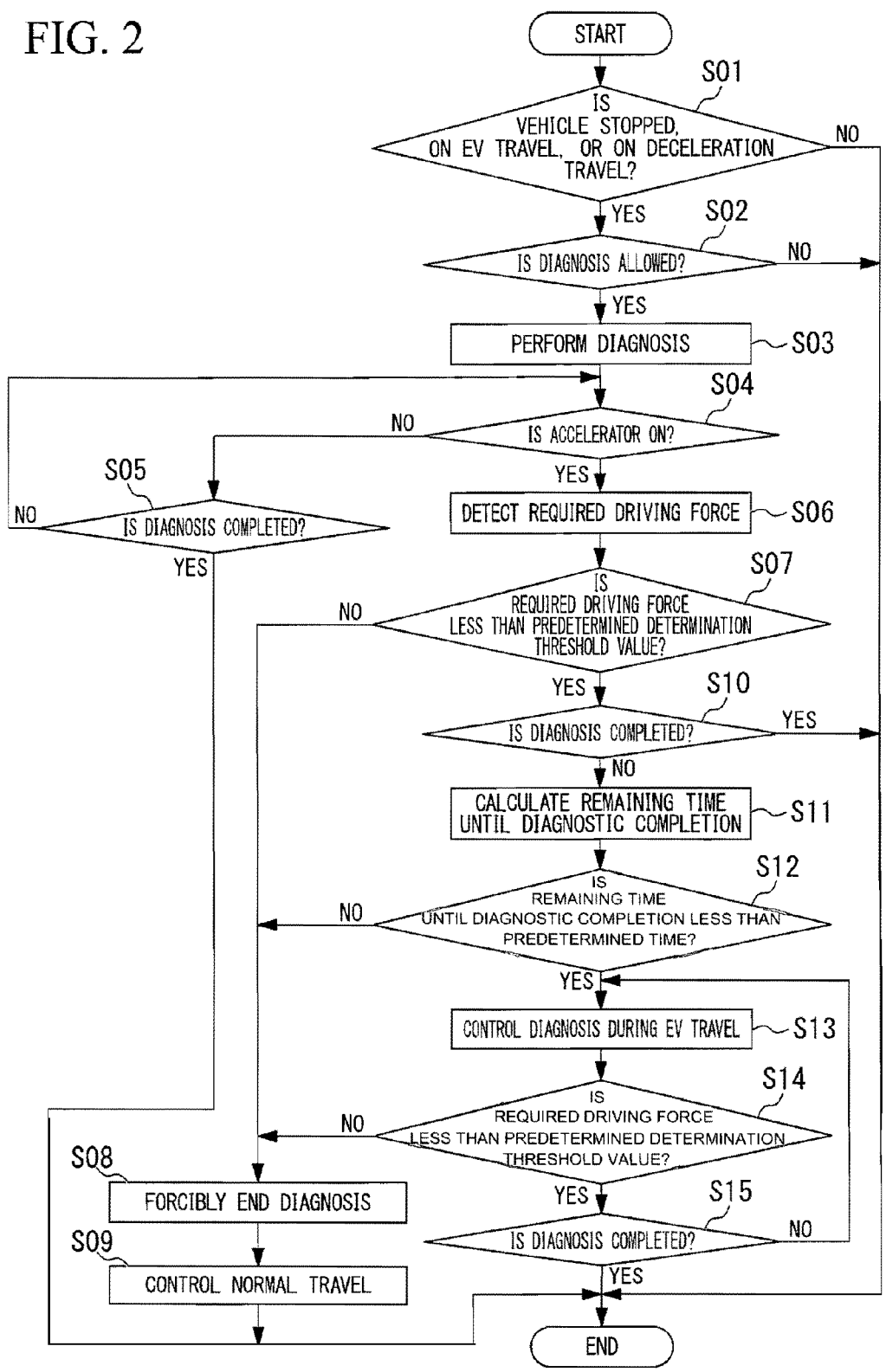
FIG. 2 is a flow chart illustrating an operation of a diagnostic apparatus of a hybrid vehicle, especially an operation determination process.

First, for example, in step S01 illustrated in FIG. 2, it is determined whether or not the vehicle is stopped and whether there is a high possibility that the vehicle may be stopped (for example, when the brake device is operated or in a case where the speed is a predetermined speed (for example, 5 km/h or the like) or less), it is determined whether or not the vehicle is in the EV travel or whether or not the vehicle is in the deceleration travel.

In a case where the determination result is "NO", the process proceeds to the end.

On the other hand, in a case where the determination result is "YES", the process proceeds to step S02.

In addition, in step S02, for example, it is determined whether or not the remaining capacity of the battery 17 is the predetermined value or more, whether or not the temperature of the coolant of the internal combustion engine 11 is a predetermined temperature or more, whether or not the temperature of a catalyst provided in an exhaust system of the internal combustion engine 11 is the predetermined temperature or more, whether or not the diagnostic performance is continued, and the like, and thereby it is determined whether or not the diagnostic performance of the vehicle state is allowed.

In a case where the determination result is "NO", the process proceeds to the end.

On the other hand, in a case where the determination result is "YES", the process proceeds to step S03 (a diagnostic unit).

In addition, the case where the diagnostic performance of the vehicle state is allowed corresponds to a state where the EV travel is operable and a proper driving of the internal combustion engine 11 is operable in such a state after completing warm-up driving.

Next, in step S03, the diagnosis of the vehicle state is performed.

Next, in step S04, it is determined whether or not it is in an ON state of the accelerator where the required driving force with the predetermined lower limit value or more is detected, by the driver pressing or increasingly pressing on the accelerator pedal.

In a case where the determination result is "YES", the process proceeds to step S06 to be described later.

On the other hand, in a case where the determination result is "NO", the process proceeds to step S05.

Then, in step S05, it is determined whether or not the diagnosis is completed. In a case where the determination result is "YES", the process proceeds to the end.

On the other hand, in a case where the determination result is "NO", the process returns to the above-described step S04.

In addition, in step S06, the required driving force of the driver is detected, based on the detection signal output from the accelerator open-degree sensor 20.

Next, in step S07, it is determined whether or not the required driving force is the predetermined determination threshold value or less.

In a case where the determination result is "YES", the process proceeds to step S10 to be described later.

On the other hand, in a case where the determination result is "NO", the process proceeds to step S08.

Then, in step S08, the diagnosis of the vehicle state is forcibly ended.

Then, in step S09, a general travel control (for example, the travel control which performs the operation mode of the diagnosis stop during the (EV) travel, such as the travel control which enables the power output from the internal combustion engine 11 according to the required driving force, without performing the diagnosis of the vehicle state) is performed, and the process proceeds to the end.

In addition, in step S10, it is determined whether or not the diagnosis is completed.

In a case where the determination result is "YES", the process proceeds to the end.

On the other hand, in a case where the determination result is "NO", the process proceeds to step S11, and in step S11, the remaining time (diagnostic completion remaining time) required until the diagnostic completion is calculated.

Next, in step S12 (the determination unit), it is determined whether or not the diagnostic completion remaining time is the predetermined time (for example, 5 seconds or the like) or less.

In a case where the determination result is "NO", the process proceeds to the above-described step S08.

On the other hand, in a case where the determination result is "YES", the process proceeds to step S13, and in step S13, the operation mode of the diagnosis during the EV travel is performed.

Next, in step S14, it is determined whether or not the required driving force is the predetermined determination threshold value or less.

In a case where the determination result is "NO", the process proceeds to the above-described step S08.

On the other hand, in a case where the determination result is "YES", the process proceeds to step S15.

Then, in step S10, it is determined whether or not the diagnosis is completed. In a case where the determination result is "YES", the process proceeds to the end.

On the other hand, in a case where the determination result is "NO", the process returns to the above-described step S13.

As described above, according to the diagnostic apparatus 10 of the hybrid vehicle and the diagnostic method of the hybrid vehicle of the present embodiment, since the required driving force with the predetermined lower limit value or more is detected when the vehicle state is diagnosed in the state where the output of the internal combustion engine 11 is zero, in a case where the hybrid vehicle 1 is travelled by transmitting the driving force output from the motor for travel 14 to the driving wheels W, if the remaining time required until the diagnostic completion is the predetermined time or less, the diagnosis is continued without stopping.

Therefore, for example, compared with the case where the diagnosis is always stopped when the required driving force with the predetermined lower limit value or more is detected during the diagnosis, necessity for the re-diagnosis is prevented from occurring at the time of the next diagnosis, and it is possible to prevent an energy consumption required for the diagnosis from increasing.

Furthermore, when the diagnosis is performed, the internal combustion engine 11 is automatically driven (motoring) without requiring the driving operation of the driver, and thus the total time for performing the diagnosis due to the re-diagnosis is prevented from being prolonged, whereby it is possible to prevent distraction to an occupant increasing due to the diagnostic performance, and to increase merchantability.

Furthermore, since the required driving force with the predetermined lower limit value or more is detected when the vehicle state is diagnosed in the state where the output of the internal combustion engine 11 is zero, in a case where the hybrid vehicle 1 is travelled by transmitting the driving force output from the motor for travel 14 to the driving wheels W, if the remaining time required until the diagnostic completion is longer than the predetermined time, the diagnosis is stopped without being continued.

Therefore, it is possible to prevent the power output from the internal combustion engine 11 from being prohibited throughout the diagnosis time longer than the predetermined time, and to ensure a desired merchantability.

In a case where the required driving force greater than the predetermined determination threshold value is detected when the vehicle state is diagnosed in the state where the output of the internal combustion engine 11 is zero, the diagnosis is stopped without being continued, and the output according to the required driving force is ensured by starting the power output from the internal combustion engine 11. Therefore, it is possible to ensure the desired merchantability.

Furthermore, even though the diagnosis is continued without being stopped because the remaining time required until the diagnostic completion is the predetermined time or less, in a case where the required driving force greater than the predetermined determination threshold value is detected, the diagnosis is stopped without being continued, and the output according to the required driving force is ensured by starting the power output from the internal combustion engine 11. Therefore, it is possible to ensure the desired merchantability.

In addition, the internal combustion engine 11 is driven (motoring) by the driving force output from the motor for travel 14, whereby the vehicle state is diagnosed in the state where the output of the internal combustion engine 11 is zero, and thus it is possible to drive the internal combustion engine 11 using the storage power of the battery 17, and it is possible to properly diagnose the vehicle state even when it is transited from the vehicle stop state to the start state.

In addition, the internal combustion engine 11 is driven by the driving force transmitted from the driving wheels W during the vehicle deceleration, whereby the vehicle state is diagnosed in the state where the output of the internal combustion engine 11 is zero, and thus it is possible to prevent the energy consumption required for driving the internal combustion engine 11 from increasing.

In addition, the internal combustion engine 11 is driven (motoring) by the driving force output from the motor for travel 14 during the EV travel, whereby the vehicle state is diagnosed in the state where the output of the internal combustion engine 11 is zero, and thus even though there is a driving force requirement from the driver when the vehicle state diagnosis is performed, in the case where the remaining time required until the diagnostic completion is the predetermined time or less, the driving force for the vehicle travel is output by the motor for travel 14, and the motoring of the internal combustion engine 11 using the motor for travel 14 is continued. Therefore, the necessity for the re-diagnosis is prevented from occurring at the time of the next diagnosis.

Figure 3:
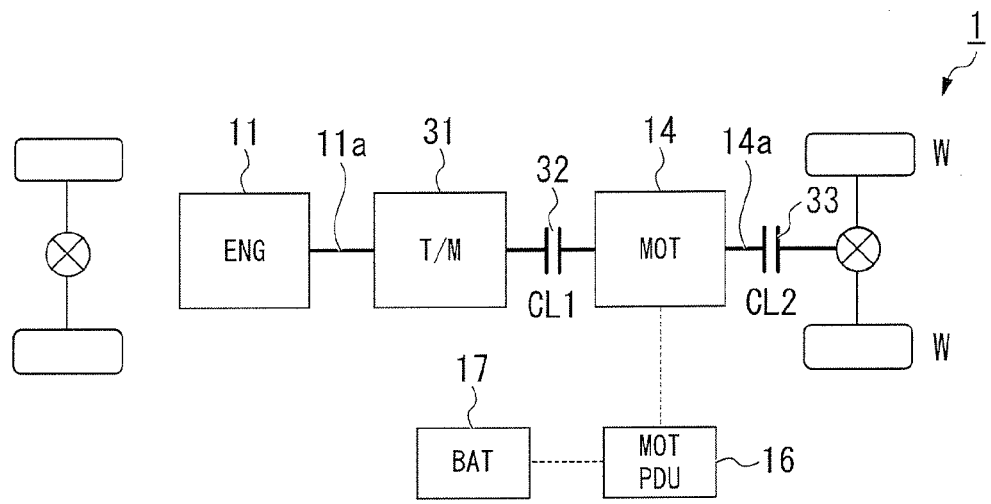
FIG. 3 is a configuration diagram of a diagnostic apparatus of a hybrid vehicle according to a first modification example of the embodiment of the present invention.

In addition, in the above-described embodiment, as is a first modification example illustrated in FIG. 3, the hybrid vehicle 1 may be the hybrid vehicle in which the crank shaft 11a of the internal combustion engine (ENG) 11 is connected to one end of the rotation shaft 14a of the motor for travel (MOT) 14 through a transmission (T/M) 31 and a first clutch (CL1) 32, and the other end of the rotation shaft 14a of the motor for travel (MOT) 14 is connected to the driving wheels W through a second clutch (CL2) 33.

The operation mode of the first modification example related to the operation which diagnoses the vehicle state of the hybrid vehicle I is described as illustrated in the following Table 2, for example.

TABLE 2

|  |  | CL1 | CL2 |
|---|---|---|---|
| Diagnosis during vehicle stop | Motoring ENG using MOT | ON | OFF |
| Diagnosis during EV travel | EV travel using MOT and motoring ENG | ON | ON |
| Diagnosis stop during (EV) travel | EV travel using MOT | OFF | ON |
|  | Start ENG using MOT (parallel or ENG driving) | ON | ON |

For example, in the operation mode of the diagnosis during the vehicle stop, the first clutch 32 is in the connection state where the power transmission is possible between the rotation shaft 14a of the motor for travel 14 and the crank shaft 11a of the internal combustion engine 11, the second clutch 33 is in the separation state where the power transmission between the rotation shaft 14a of the motor for travel 14 and the driving wheels W is in the cutoff state, and the internal combustion engine 11 is driven (motoring) by the driving force output from the motor for travel 14 which performs the power running, and thereby the state where the fuel supply and the ignition are not performed.

In addition, for example, in the operation mode of the diagnosis during the EV travel, the first clutch 32 and the second clutch 33 are in the connection state, the driving force output from the motor for travel 14 which performs the power running is transmitted to the internal combustion engine 11 and the driving wheels W, the internal combustion engine 11 is driven (motoring) by the driving force output from the motor for travel 14 which performs the power running, and thereby the fuel supply and the ignition are not performed.

In addition, for example, during the EV travel of the hybrid vehicle 1 or during the travel of the ENG driving in which the driving force output from the internal combustion engine 11 is transmitted to the driving wheels W, the operation mode of the diagnosis stop during the travel (EV) is a mode which stops the diagnosis of the vehicle state.

In the operation mode, the EV travel or otherwise the parallel travel or the state of the ENG driving is selected.

In the EV travel, the motor for travel 14 does not perform the power running, the first clutch 32 is in the separation state and the second clutch 33 is in the connection state, and thereby the driving force output from the motor for travel 14 is transmitted to the driving wheels W.

In the parallel travel, the first clutch 32 and the second clutch 33 is in the connection state, the driving force output from the motor for travel 14 which performs the power running is transmitted to the internal combustion engine 11 and the driving wheels W, the internal combustion engine 11 performs the power output by being started by the driving force output from the motor for travel 14 which performs the power running, and thereby the driving force output from the internal combustion engine 11 is transmitted to the driving wheels W.

In the ENG driving, the first clutch 32 and the second clutch 33 are in the connection state, the motor for travel 14 is in the stop state after at least the internal combustion engine 11 is started, and thereby the driving force output from the started internal combustion engine 11 is transmitted to the driving wheels W.

Figure 4:
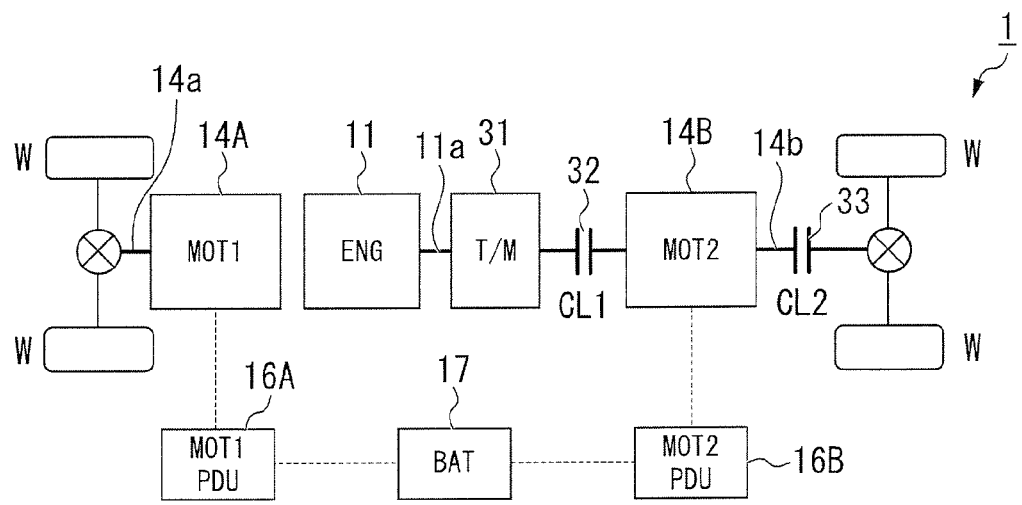
FIG. 4 is a configuration diagram of a diagnostic apparatus of a hybrid vehicle according to a second modification example of the embodiment of the present invention.

In addition, in the above-described embodiment, for example, as is a second modification example illustrated in FIG. 4, the hybrid vehicle 1 may be the hybrid vehicle in which the rotation shaft 14*a* of the motor for travel (MOT1) 14 whose driving (conduction) is controlled by a first MO1IPDU 16A is connected to one driving wheel W of the front wheel and the rear wheel, one end of a rotation shaft 14*b* of a second motor for travel (MOT2) 14B whose driving (conduction) is controlled by a second MOT2PDU 16B through the transmission (T/M) 31 and the first clutch (CL1) 32 is connected to the crank shaft 11*a* of the internal combustion engine (ENG) 11, and the other end of the rotation shaft 14*b* of the second motor for travel (MOT2) 14B is connected to the driving wheels W through the second clutch (CL2) 33.

The operation mode related to the operation which diagnoses the vehicle state of the hybrid vehicle 1 of the second modification example is described as illustrated in the following Table 3, for example.

TABLE 3

| | | CL1 | CL2 |
|---|---|---|---|
| Diagnosis during vehicle stop | Motoring ENG using MOT2 | ON | OFF |
| Diagnosis during | EV travel using MOT1 and motoring | ON | OFF |

TABLE 3-continued

| | | CL1 | CL2 |
|---|---|---|---|
| EV travel | ENG using MOT2 or driving wheels | | ON |
| Diagnosis stop during (EV) travel | EV travel using MOT1 | OFF | OFF |
| | Series | ON | OFF |
| | parallel or ENG driving | | ON |

For example, in the operation mode of the diagnosis during the vehicle stop, the first clutch 32 is in the connection state where the power transmission is possible between the rotation shaft 14*b* of the second motor for travel 14B and the crank shaft 11*a* of the internal combustion engine 11, and the second clutch 33 is in the separation state where the power transmission between the rotation shaft 14*b* of the second motor for travel 14B and the driving wheels W is in the cutoff state. The internal combustion engine 11 is driven (motoring) by the driving force output from the second motor for travel 14B which performs the power running, and thereby the fuel supply and the ignition are not performed.

In addition, for example, in the operation mode of the diagnosis during the EV travel, the first clutch 32 is in the connection state and the second clutch 33 is in the separation state or in the connection state, the driving force output from the first motor for travel 14A (motor) which performs the power running is transmitted to one driving wheel W of the front wheel and the rear wheel, the internal combustion engine 11 is driven (motoring) by the driving force output from the second motor for travel 14B which performs the power running or by the driving force transmitted from the other driving wheel W side of the front wheel and the rear wheel, and thereby the fuel supply and the ignition are not performed.

In addition, in the connection state of the second clutch 33, the driving force output from the second motor for travel 14B which performs the power running may be transmitted to the other driving wheel W of the front wheel and the rear wheel.

In addition, for example, during the EV travel of the hybrid vehicle 1 or during the travel of the ENG driving in which the driving force output from the internal combustion engine 11 is transmitted to the driving wheels W, the operation mode of the diagnosis stop during the (EV) travel is a mode which stops the diagnosis of the vehicle state.

In the operation mode, the EV travel, or otherwise the series travel or the parallel travel, or otherwise the state of the ENG driving is selected.

In the EV travel, the driving force output from the first motor for travel 14A which performs the power running is transmitted to one driving wheel W of the front wheel and the rear wheel, and thereby the first clutch 32 and the second clutch 33 are in the separation state.

In the series travel, the driving force output from the first motor for travel 14A which performs the power running is transmitted to one driving wheel W of the front wheel and the rear wheel, the first clutch 32 is in the connection state, and the second clutch 33 is in the separation state.

Then, the internal combustion engine 11 is started by the driving force output from the second motor for travel 14B or by the driving force transmitted from the other driving wheel W side of the front wheel and the rear wheel, performs the power output while rotating the second motor for travel 14B, and thereby the second motor for travel 14B performs the power generation driving using the driving force output from the stated internal combustion engine 11.

In the parallel travel, the driving force output from the first motor for travel 14A which performs the power running is transmitted to one driving wheel W of the front wheel and the rear wheel, and the first clutch 32 and the second clutch 33 are in the connection state.

Then, the internal combustion engine 11 is started by the driving force output from the second motor for travel 14B or by the driving force transmitted from the other driving wheel W side of the front wheel and the rear wheel, performs the power output while rotating the second motor for travel 14B, and thereby the driving force output from the started internal combustion engine 11 is transmitted to the other driving wheel W of the front wheel and the rear wheel.

In the ENG driving, the first clutch 32 and the second clutch 33 are in the connection state, the first motor for travel 14A is in the stop state after at least the internal combustion engine 11 is started, and thereby the driving force output from the started internal combustion engine 11 is transmitted to the other driving wheel W of the front wheel and the rear wheel.

In addition, in the above-described embodiments, when the travel is performed by the motor for travel 14 while the diagnosis of the vehicle state is performed, the output supplied from the motor for travel 14 to the driving wheels W may be limited more than usual.

(2) In the above embodiments, the control device may stop the vehicle state diagnosis using the diagnostic unit, in a case where the remaining time is longer than the predetermined time in the determination result of the determination unit.

(3) In the above embodiments, the control device may stop the vehicle state diagnosis using the diagnostic unit, in a case where the required driving force greater than a predetermined determination threshold value which is greater than the predetermined lower limit value is detected by the required driving force detection unit when the vehicle state is diagnosed by the diagnostic unit.

(4) In the above embodiments, the control device may cause the motor to output the driving force, because the remaining time is the predetermined time or less in the determination result of the determination unit, and stop the vehicle state diagnosis using the diagnostic unit, in a state where the vehicle state diagnosis is continued by the diagnostic unit, in a case where the required driving force greater than the predetermined determination threshold value greater than the predetermined lower limit value using the required driving force detection unit.

(5) In the above embodiments, the diagnostic unit may diagnose the vehicle state in a state where the internal combustion engine is driven by the driving force output from the motor during vehicle stop.

(6) In the above embodiments, the diagnostic unit may diagnose the vehicle state in a state where the internal combustion engine is driven by the driving force transmitted from a driving wheel during vehicle deceleration.

(7) In the above embodiments, the diagnostic unit may diagnose the vehicle state in a state where the internal combustion engine is driven by the driving force output from the motor during an EV travel using the motor.

In case of (2), when the vehicle state is diagnosed by the diagnostic unit by motoring the internal combustion engine using the motor in a state where the output of the internal combustion engine is zero, the required driving force with the predetermined lower limit value or more is detected by the required driving force detection unit, and thus in a case where the hybrid vehicle is traveled by transmitting the driving force of the motor to the driving wheels, if the remaining time required until the diagnostic completion is longer than the predetermined time, the diagnosis is stopped without being continued. Therefore, it is possible to prevent a power output from the internal combustion engine from being prohibited throughout the diagnosis time longer than the predetermined time, and to ensure a desired merchantability.

In case of (3), when the vehicle state is diagnosed by the diagnostic unit by motoring the internal combustion engine using the motor in a state where the output of the internal combustion engine is zero, in a case where the required driving force greater than a predetermined determination threshold value is detected by the required driving force detection unit, the diagnosis is stopped without being continued, and an output according to the required driving force is ensured by starting the power output from the internal combustion engine. Therefore, it is possible to ensure the desired merchantability.

In case of (4), even though the diagnosis is continued without being stopped since the remaining time required until the diagnostic completion is the predetermined time or less, in a case where the required driving force greater than the predetermined determination threshold value is detected by the required driving force detection unit, the diagnosis is stopped without being continued, and the output according to the required driving force is ensured by starting the power output from the internal combustion engine. Therefore, it is possible to ensure the desired merchantability.

In case of (5), even though there is a driving force requirement from the driver when a vehicle state diagnosis is performed by motoring the internal combustion engine using the motor during the vehicle stop, in a case where the remaining time required until the diagnostic completion is the predetermined time or less, since the driving force for the vehicle travel is output by the motor, and the motoring of the internal combustion engine using the motor is continued, the necessity for the re-diagnosis is prevented from occurring at the time of the next diagnosis.

In case of (6), the internal combustion engine is driven by the driving force transmitted from the driving wheels during the vehicle deceleration, and thus even though there is the driving force requirement from the driver when the vehicle state diagnosis is performed, in a case where the remaining time required until the diagnostic completion is the predetermined time or less, the driving force for the vehicle travel is output by the motor, and the driving of the internal combustion engine is continued by motoring the internal combustion engine using the motor. Therefore, the necessity for the re-diagnosis is prevented from occurring at the time of the next diagnosis.

In case of (7), even though there is a driving force requirement from the driver when the vehicle state diagnosis is performed by motoring the internal combustion engine using the motor during the EV travel, in a case where the remaining time required until the diagnostic completion is the predetermined time or less, the driving force for the vehicle travel is output by the motor, and the motoring of the internal combustion engine using the motor is continued. Therefore, the necessity for the re-diagnosis is prevented from occurring at the time of the next diagnosis.

INDUSTRIAL APPLICABILITY

According to the present invention, the diagnostic apparatus and the diagnostic method of the hybrid vehicle can be provided in which the energy consumption required for the vehicle diagnosis is prevented from increasing, and distraction to the occupant can be prevented from increasing due to the diagnostic performance.

REFERENCE SIGNS LIST 1 hybrid vehicle
10 diagnostic apparatus of hybrid vehicle
11 internal combustion engine
12 motor for power generation 14 motor for travel (motor)
14A first motor for travel (motor)
14B second motor for travel
17 battery (storage device)
18 control device (diagnostic unit, required driving force detection unit, determination unit, and control unit)
19 sensor (state detection unit)
20 accelerator open-degree sensor (required driving force detection unit)
Step S03 diagnostic unit
Step S12 determination unit

The invention claimed is:

1. A diagnostic apparatus of a hybrid vehicle which includes an internal combustion engine, a motor that generates a driving force for vehicle travel, and a diagnostic unit that diagnoses a vehicle state by motoring the internal combustion engine using the motor in a state where an output of the internal combustion engine is zero, the apparatus comprising:
   a required driving force detection unit configured to detect a required driving force of a driver;
   a determination unit configured to determine whether or not a remaining time required until a diagnostic is completed is equal to or less than a predetermined time, in a case where the required driving force with a predetermined lower limit value or more is detected by the required driving force detection unit when the vehicle state is diagnosed by the diagnostic unit; and
   a control device configured to cause the motor to output the driving force for the vehicle travel, in a case where the remaining time is the predetermined time or less in the determination result of the determination unit, and continues the vehicle state diagnosis using the diagnostic unit by motoring the internal combustion engine using the motor in the state where the output of the internal combustion engine is zero.

2. The diagnostic apparatus of the hybrid vehicle according to claim 1, wherein the control device stops the vehicle state diagnosis using the diagnostic unit, in a case where the remaining time is longer than the predetermined time in the determination result of the determination unit.

3. The diagnostic apparatus of the hybrid vehicle according to claim 1, wherein the control device stops the vehicle state diagnosis using the diagnostic unit, in a case where the required driving force greater than a predetermined determination threshold value which is greater than the predetermined lower limit value is detected by the required driving force detection unit when the vehicle state is diagnosed by the diagnostic unit.

4. The diagnostic apparatus of the hybrid vehicle according to claim 1, wherein the control device causes the motor to output the driving force, because the remaining time is the predetermined time or less in the determination result of the determination unit, and stops the vehicle state diagnosis using the diagnostic unit, in a state where the vehicle state diagnosis is continued by the diagnostic unit, in a case where the required driving force greater than the predetermined determination threshold value greater than the predetermined lower limit value using the required driving force detection unit.

5. The diagnostic apparatus of the hybrid vehicle according to claim 1, wherein the diagnostic unit diagnoses the vehicle state in a state where the internal combustion engine is driven by the driving force output from the motor during vehicle stop.

6. The diagnostic apparatus of the hybrid vehicle according to claim 1,
   wherein the diagnostic unit diagnoses the vehicle state in a state where the internal combustion engine is driven by the driving force transmitted from a driving wheel during vehicle deceleration.

7. The diagnostic apparatus of the hybrid vehicle according to claim 1, wherein the diagnostic unit diagnoses the vehicle state in a state where the internal combustion engine is driven by the driving force output from the motor during an EV travel using the motor.

8. A diagnostic method of a hybrid vehicle which includes an internal combustion engine, a motor that generates a driving force for vehicle travel, a diagnostic unit that diagnoses a vehicle state by motoring the internal combustion engine using the motor in a state where an output of the internal combustion engine is zero, and a required driving force detection unit that detects a required driving force of a driver, the method comprising:
   a step of determining whether or not a remaining time required until a diagnostic is completed is equal to or less than a predetermined time, in a case where the required driving force with a predetermined lower limit value or more is detected by the required driving force detection unit when the vehicle state is diagnosed by the diagnostic unit; and
   a step of causing the motor to output the driving force for the vehicle travel, in a case where the remaining time is the predetermined time or less in the determination result, and continuing the vehicle state diagnosis using the diagnostic unit by motoring the internal combustion engine using the motor in the state where the output of the internal combustion engine is zero.

* * * * *